Patented May 14, 1940

2,200,391

UNITED STATES PATENT OFFICE 2,200,391

SOLVENT EXTRACTION OF GLYCERIDE OILS

Stephen E. Freeman, Milwaukee, Wis., assignor to Pittsburgh Plate Glass Company, Allegheny County, Pa., a corporation of Pennsylvania No Drawing. Application January 17, 1939, Serial No. 251,340

14 Claims. (Cl. 87—6)

The present invention relates to the treatment of fat and oils, of the glyceride type, and it has particular relation to the treatment of glyceride oils such as linseed oil, oiticica oil, tung oil, soybean oil, cotton seed oil, hemp seed oil, fish oil, tallow and similar oils which are employed as film-forming constituents in paints, varnish, enamels, synthetic resins, and as food products, drug products and in soaps, plastics, etc.

One object of the invention is to separate an oil of the glyceride type into various fractions each or most of which will have greater value than the original oil when the fraction is suitably selected for use in paints, synthetic resins, food products, plastics, soaps, etc.

For example, the invention provides a simple and convenient method of separating oils comprising mixtures of glycerides of fatty acids of different degrees or types of unsaturation into fractions certain of which contain a higher ratio of the more unsaturated or more actively unsaturated components than the original mixture.

A second object of the invention is to provide a method of extracting such glyceride oils as linseed, soy-bean, cotton seed, fish oil, train oil and similar oils from pulps or meals containing them, while leaving most of the phosphatides in a readily removable form in the meal.

A third object of the invention involves the provision of a simple and convenient method of separating mixtures of saturated and unsaturated free fatty acids into fractions, one of which is relatively more saturated than the other.

These and other objects will be apparent from consideration of the following specification and the appended claims.

Oils of the glyceride type such as are employed in the preparation of foods, soaps, or as film-forming ingredients in many paints, varnishes and enamels are found in certain plants or in the seeds thereof, and as fatty constituents in the bodies of animals and fish, and are essentially different from petroleum or mineral oil, since they are composed mainly of mixtures of the glycerides of the fatty acids such as stearic, palmitic, oleic, linoleic, clupanodonic, linolenic, licanic, elaeostearic, and many others.

The number and type of glycerides present will vary, depending upon the specific oil. The general or type structure of these glycerides may be represented by the formula:

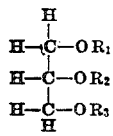

and are mono- di or tri glycerides according to the number of acyl groups in positions $R_1$, $R_2$ and $R_3$ which have been introduced by esterification of the glycerol with a fatty acid.

The principal difference between these glycerides aside from variations in the number of ester groups, consists in variation in the length of the carbon chains, and in the number and arrangement of the double bonds in the alkyl groups or residues. For example, palmitic acid of the formula

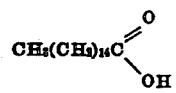

contains 16 carbon atoms while stearic acid contains 18 carbon atoms. The formula of stearic acid is

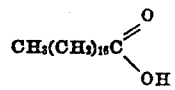

Both are free of double bonds and are non-drying. Oleic acid of the probable formula $CH_3(CH_2)_7CH:CH(CH_2)_7COOH$, has 18 carbon atoms and contains a single double bond, but its glyceride is non-drying. Linoleic acid which also contains 18 carbon atoms has two non-conjugate double bonds and these bonds by reason of their number are of such activity that the glycerides possess drying properties.

The following constitutes the formula of this acid:

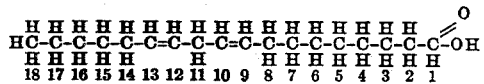

Linolenic acid (9, 12, 15-octadecatrienoic acid) differs only in having an additional double bond:

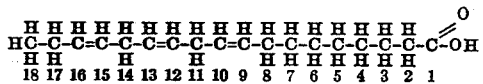

Elaeostearic acid and licanic acid, glycerides of which occur in tung oil and oiticica oil respectively contain double bonds in conjugate relationship in which they are extremely active, and their glycerides dry faster than any of the foregoing.

Elaeostearic acid (9, 11, 13 octodecatrienoic acid) is of the formula:

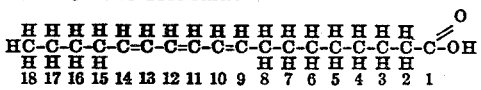

These glyceride oils are customarily extracted from the seed meals or other material containing them by application of high pressure, or by extraction with a suitable organic solvent, such as hexane. Both of these methods are objectionable for numerous reasons. For example, in case pressing is resorted to, the removal of oil is incomplete and in event the percentage of oil in the meal or pulp is initially low, the unextracted oil may constitute a very large percentage of the total. Extraction by means of organic solvents, such as hexane involves a very high explosion hazard, and violent explosions often resulting in loss of life are not uncommon in plants employing such process. Both processes are objectionable because of non-selectivity. For example, in either the pressing operation or the solvent extraction with a hydrocarbon solvent 0.5 to 1.% of phosphatides, 1 or 2% free fatty acids are obtained in the extracted oils. Non-drying constituents such as relatively highly saturated glycerides are also removed in the oil. At the same time certain materials which seem to exert an antioxidant effect upon the drying oils are obtained in the mixture.

Most of the components of the natural oils and the substances (meals or the like) containing the oils are of themselves of substantial value for various purposes. For example, the pulps are valuable as cattle foods, the more highly unsaturated glycerides or the glycerides containing conjugate double bonds, which are more highly active than the more saturated glycerides, are useful as film-forming constituents in paints, varnishes, and lacquers. They are also useful as modifiers in resins. The saturated glycerides and the hydrogenated or unhydrogenated glycerides of a low degree of saturation are useful in foods and the like. The free acids of all types are useful in the preparation of resins, plastics and soaps and other important applications. The phosphatides are of value in foods, pharmaceutical preparations and as emulsifying agents, etc.

It is the object of refining processes for such oils to remove at least a part of certain of the constituents which for specific purposes are objectionable. For the paint and varnish industries it is particularly desirable to remove those portions which cause so-called "break" or sludge formation upon heating, and to remove excess free fatty acids, color and non-drying portions. The conventional method of refining these oils involves the application either of strong sulphuric acid which chars and coagulates the by-product portions, or treatment with sodium hydroxide. Both of these methods are drastic in their action upon the oil destroying some portions entirely, thus producing a by-product which has little or no value. In addition to causing destruction or degradation of the by-products, such treatment also tends to decompose a part of the drying, or film-forming glycerides. The methods are tedious and require considerable equipment and much space for storage purposes. Furthermore, the reagents employed in the process are not recoverable and along with the by-products which are obtained in a degraded form constitute a considerable source of loss.

The present invention involves as one feature the discovery that certain types of non-reactive organic polar solvents notably those which, at low temperatures, are not completely miscible with glyceride oils, may by proper control of temperature be employed preferentially to dissolve unsaturated or more actively unsaturated components of glyceride oils either from simple or crude mixtures of the glycerides, or from materials such as seed meals or pulps containing the glycerides. Accordingly, by treating the oils, or materials, such as seed meals or pulps containing the oils, with one or more of the selective solvents at a temperature sufficiently low to obviate complete solution of the oil and at a temperature high enough for the solvent to be liquid, it becomes possible to separate the mixture into two liquid components, one comprising the solvent saturated with a fraction rich in unsaturates, the second consisting of glycerides which are relatively poor in unsaturates.

These liquids contain activating groups, which usually are polar and which may be selected from a relatively large class among which may be enumerated the following:

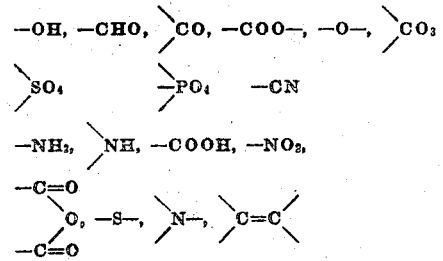

Secondary or tertiary carbon atoms in a hydrocarbon nucleus and the positions of the various groups in the molecule exert a substantial influence upon the characteristics of treating liquid.

The capacity of these groups to activate the molecules of which they are constituents is variable. In general, there must be at least one activating or polarizing group for every four carbon atoms and in many cases the ratio of the groups must be substantially increased.

The permissible number of carbon atoms in the molecule of the solvent for each activating group may be tabulated as follows:

*Table A*

| Activating group | Permissible number carbons per group |
|---|---|
| —OH | 3 |
| >CO | 3 |
| —COO— | 3 |
| —C=O, >O, —C<>O | 4 |
| —CHO | 2 |
| —COOH | 2 |
| —NO₂ | 2 |
| >CO₃ | 2 |
| SO₄ | >2 |
| NH₂ | 2 |
| >NH | 1 |
| —CN | 3 |
| >PO₄ | 6 |
| —O— | 1 |
| >C=C< | 1 |
| —S— | 1 |
| >N— | 1 |

In most cases the applicability of a particular solvent for the fractionation of glyceride oils can be determined from the above table in which the permissible carbon atoms for each of the more common of the polar or activating groups are listed. In order to determine if a particular solvent is applicable, the number of permissible carbon atoms for all of the activating groups are added together. If the sum is equal to or greater than the number of carbon atoms actually present in the nucleus of the solvent molecule, the latter can usually be employed selectively to dissolve unsaturated glycerides from more saturated glycerides. The operation of the rule is illustrated by furfural

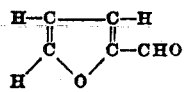

The latter contains two double bond (C=C) groups, one oxy linkage

and an aldehyde

group. The sum of permissible carbon atoms for these groups is 1+1+1+2 or 5, which exactly corresponds to the number of carbon atoms in the furfural nucleus.

In the cases of groups having but low activating power, e. g.

—O—, etc., it is usually necessary that an additional and more active group be included in the molecule. However, the groups of low activating power then increase the selective action of the molecule for unsaturates. This is also true with the halogens, such as chlorine and bromine.

It will be apparent that most of the solvents, if sufficiently heated, will become miscible with all components of the oil. Accordingly, the temperature must be sufficiently low and ratio of the solvent must be maintained in a region where solution is incomplete. Usually, the lower the temperature of treatment (within reasonable limits) the more selective will be the solvent and the higher will be the proportion of the unsaturates in the fraction dissolved. However, the proportion of the glycerides recovered in the dissolved fraction is also decreased. Therefore, in commercial operations it is preferred to compromise between extreme selectivity and high yields, and to employ the solvent at such temperature and in such proportion that two fractions separate but that a reasonable yield is obtained in the dissolved fraction.

In the practice of the invention, it is preferred to treat the oils containing saturated and unsaturated glycerides at the temperature and in a ratio at which separation into fractions occurs. The treatment of oil or meal may be by batch, or multi-stage or countercurrent or concurrent flow, or by combinations of these methods.

In the application of the process to meals or pulp in order to remove the oil therefrom, the material to be treated containing an oil, e. g. soy-bean oil, or linseed oil, or marine oil, or the like may be treated at a temperature sufficient to dissolve all or a substantial proportion of the oil therein. The liquids are separated from the solids and the temperature is adjusted to obtain separation into two liquid phases, one of which is rich in relatively saturated glycerides and contains a small amount of solvent and the second consists of solvent in which is dissolved a fraction rich in unsaturates. The ratio of solvent to oil must not be too low because an undue proportion of it will be dissolved in the more saturated fraction and there will not then be sufficient amount satisfactorily to dissolve and separate the more unsaturated fraction. Conversely, if too much solvent is employed an excessive amount of saturates will be taken into solution and fractionation cannot be accomplished. Probably in most instances the solvent should be within a range of two to twelve parts by volume of solvent to one part of oil. In batch extractions, a ratio of about four parts of solvent to one part of oil has been found to be a good average. Mechanical separation of the two fractions by settling and decantation, or by centrifugation may be easily effected. The solvent can be recovered by steam distillation or by crystallization or by the addition of a non-solvent for the oil such as water, in order to cause an alteration of the characteristics of the solvent, etc.

A series of tests was conducted upon soy-bean oil having an iodine number of 136, the solvents were employed in the ratio of four parts to one part of oil. In the event liquid separation did not occur at room temperature the mixtures were chilled. The chilling was continued until separation of two liquid fractions occurred, or if no separation took place, to a temperature of −20° C. The solvents tested are listed in the following table. In the event that solidification of one or more components of the mixture occurred before liquid separation took place the mixture was recorded as miscible. The third column in which the number of carbon atoms in the molecule is listed in the column and the maximum number of carbon atoms theoretically permissible as calculated by assignment of numbers from Table A to the activating groups are included in the last column.

Those solvents capable of separating the oil into two fractions are designated as "I." Those which do not so separate are designated as "M."

Table B

| Solvent | Miscibility at −20° C. or above | Carbon atoms— | |
|---|---|---|---|
| | | In the molecule | Calculated as maximum permissible for immiscibility |
| *Hydroxyl* | | | |
| Methyl alcohol | I | 1 | 3 |
| Ethyl alcohol | I | 2 | 3 |
| n-Propyl alcohol | I | 3 | 3 |
| Iso-propyl alcohol | I | 3 | 3 |
| n-Butyl alcohol | M | 4 | 3 |
| Iso-butyl alcohol | M | 4 | 3 |
| Tertiary-butyl alcohol | M | 4 | 3 |
| n-Amyl alcohol | M | 5 | 3 |
| Iso-amyl alcohol | M | 5 | 3 |
| Sec.-amyl alcohol | M | 5 | 3 |
| Capryl alcohol | M | 8 | 3 |
| Cyclohexyl alcohol | M | 6 | 3 |
| Ethylene glycol | I | 2 | 6 |
| Propylene glycol | I | 3 | 6 |
| Glycerine | I | 3 | 9 |
| *Hydroxyl, ester* | | | |
| Methyl glycolate | I | 3 | 6 |
| Ethyl glycolate | I | 4 | 6 |
| Beta-hydroxy ethyl acetate | I | 4 | 6 |
| Methyl lactate | I | 4 | 6 |
| Ethyl lactate | I | 5 | 6 |
| Butyl lactate | M | 7 | 6 |
| Monoacetin | I | 5 | 9 |
| Diacetin | I | 7 | 9 |

| Solvent | Miscibility at −20° C. or above | Carbon atoms— In the molecule | Calculated as maximum permissible for immiscibility |
|---|---|---|---|
| *Hydroxyl, carbonyl* | | | |
| Methyl butanolone | I | 5 | 6 |
| Acetyl methyl carbinol | I | 4 | 6 |
| Diacetone alcohol | I | 6 | 6 |
| *Hydroxyl, ether* | | | |
| Methyl cellosolve (b-methoxy ethanol) | I | 3 | 4 |
| Cellosolve (b-ethoxy ethanol) | I | 4 | 4 |
| Butyl cellosolve (b-butoxy ethanol) | M | 6 | 4 |
| Diethylene glycol | I | 4 | 7 |
| Triethylene glycol | I | 6 | 8 |
| Mono-ethyl ether of diethylene glycol | I | 6 | 5 |
| Mono-butyl ether of diethylene glycol | M | 8 | 5 |
| 2-hydroxy methyl 1,3-dioxolane | I | 4 | 5 |
| *Hydroxyl, double bonds* | | | |
| Allyl alcohol | I | 3 | 4 |
| Phenol | M | 6 | 6 |
| Cresylic acid | M | 7 | 6 |
| o-Amyl phenol | M | 11 | 6 |
| 2,4-diamyl phenol | M | 16 | 6 |
| Benzyl alcohol | M | 7 | 6 |
| Geraniol | M | 10 | 5 |
| *Hydroxyl, triple bond* | | | |
| Dimethyl ethynyl carbinol | M | 5 | 4 |
| *Hydroxyl, halogen* | | | |
| Ethylene chlorohydrin | I | 2 | 3 |
| Propylene chlorohydrin | I | 3 | 3 |
| Glycerol monochlorohydrin | I | 3 | 6 |
| *Hydroxyl, other* | | | |
| Beta-hydroxy propionitrile | I | 3 | 6 |
| Beta-ethoxy ethyl lactate | I | 7 | 7 |
| Beta-ethoxy ethyl glycolate | I | 6 | 7 |
| Furfuryl alcohol | I | 5 | 6 |
| Eugenol | M | 10 | 8 |
| Acetochlorohydrin | I | 4 | 4 |
| Dichloro triethylene glycol | I | 6 | 6 |
| 2,4-dichlorophenol | M | 6 | 6 |
| 2-bromo 4-tertiary-butyl phenol | M | 10 | 6 |
| Diethyl amino ethanol | I | 6 | 4 |
| Salicylaldehyde | M | 7 | 8 |
| *Carboxyl* | | | |
| Formic acid | I | 1 | 2 |
| Acetic acid | I | 2 | 2 |
| Propionic acid | M | 3 | 2 |
| Isobutyric acid | M | 4 | 2 |
| *Acid anhydride* | | | |
| Acetic | I | 4 | 5 |
| Butyric | M | 8 | 4 |
| *Ester* | | | |
| Methyl formate | I | 2 | 3 |
| Ethyl formate | M | 3 | 3 |
| Glycol diformate | I | 4 | 6 |
| Methyl acetate | M | 3 | 3 |
| Ethyl acetate | M | 4 | 3 |
| Triacetin | I | 9 | 9 |
| Glycol diacetate | I | 6 | 6 |
| Ethyl acetyl glycolate | I | 6 | 6 |
| Ethylidine diacetate | I | 6 | 6 |
| Methyl malonate | I | 5 | 6 |
| Ethyl oxalate | I | 6 | 6 |
| *Ester, carbonyl* | | | |
| Methyl levulinate | I | 6 | 6 |
| Ethyl levulinate | I | 7 | 6 |
| Methyl acetoacetate | I | 5 | 6 |
| Ethyl acetoacetate | I | 6 | 6 |
| *Ester, ether* | | | |
| Methyl cellosolve acetate | I | 5 | 4 |
| Cellosolve acetate | M | 6 | 4 |
| *Ester, imido* | | | |
| Ethyl N-methyl carbamate | I | 4 | 4 |
| *Ester, double bond* | | | |
| Vinyl acetate | M | 4 | 4 |
| Allyl formate | M | 4 | 4 |
| Ethyl maleate | I | 8 | 7 |
| *Ester—double bond—ether* | | | |
| Methyl furoate | I | 6 | 6 |
| n-Propyl furoate | M | 8 | 6 |
| Furfuryl acetate | M | 7 | 6 |
| *Ester, triple bond* | | | |
| Dimethyl ethynyl carbinol acetate | M | 7 | 4 |
| *Ester, halogen* | | | |
| Methyl chloroacetate | I | 3 | 3 |
| Ethyl chloroacetate | M | 4 | 3 |
| Chloro ethyl acetate | M | 4 | 3 |
| Ethyl dichloro acetate | M | 4 | 3 |
| *Ester, cyanide* | | | |
| Methyl cyano acetate | I | 4 | 6 |
| *Aldehyde* | | | |
| Acetaldehyde | I | 2 | 2 |
| Propionaldehyde | M | 3 | 2 |
| Butyraldehyde | M | 4 | 2 |
| Octylaldehyde | M | 8 | 2 |
| *Aldehyde, other* | | | |
| Methoxy acetaldehyde | I | 3 | 3 |
| Furfural | I | 5 | 5 |
| Cinnamaldehyde | M | 9 | 6 |
| Crotonaldehyde | M | 4 | 3 |
| Benzaldehyde | M | 7 | 5 |
| m-Nitrobenzaldehyde | I | 7 | 7 |
| *Carbonyl* | | | |
| Acetone | M | 3 | 3 |
| Methyl ethyl ketone | M | 4 | 3 |
| Butyrone | M | 7 | 3 |
| Methyl isobutyl ketone | M | 6 | 3 |
| Diisobutyl ketone | M | 9 | 3 |
| Diacetyl | I | 4 | 6 |
| Acetonyl acetone | I | 6 | 6 |
| *Carbonyl, ether, double bonds* | | | |
| Furfural acetone | M | 8 | 7 |
| *Carbonyl, double bonds* | | | |
| Mesityl oxide | M | 6 | 4 |
| Acetophenone | M | 8 | 6 |
| Benzal acetone | M | 10 | 7 |
| *Carbonyl, amido* | | | |
| Formamide | I | 1 | 5 |
| Acetamide | I | 2 | 5 |
| Propionamide | I | 3 | 5 |
| Butyramide | I | 4 | 5 |
| *Ether* | | | |
| Diethyl ether | M | 2 | 1 |
| Diisopropyl ether | M | 6 | 1 |
| Dibutyl ether | M | 8 | 1 |
| Propylene ether | M | 3 | 1 |
| Dioxane | M | 4 | 2 |
| Dioxolane | M | 3 | 2 |
| Acetal | M | 6 | 2 |
| Ethylal | M | 5 | 2 |
| Dimethyl acetal | M | 4 | 2 |
| Dimethyl cellosolve | M | 4 | 3 |
| Methoxy methylal | M | 4 | 3 |
| Dimethoxy tetraglycol | M | 10 | 5 |
| *Ether, double bonds* | | | |
| Tetramethyl dihydrofurane | M | 8 | 2 |
| Dimethyl furane | M | 6 | 3 |
| Anisole | M | 7 | 4 |
| *Ether, triple bond* | | | |
| Ethyl ether of dimethyl ethynyl carbinol | M | 7 | 2 |
| *Ether, chloro* | | | |
| Beta, beta'-dichloro diethyl ether | M | 4 | 1 |
| Dichloro diisopropyl ether | M | 6 | 1 |
| Monochloro diethyl ether | M | 4 | 1 |
| 2,4-dichloro dioxane | M | 4 | 2 |
| Chloroacetal | M | 6 | 2 |
| Chloroethoxy chlorethyl ether | M | 6 | 2 |
| *Ether, imino* | | | |
| Morpholine | M | 4 | 3 |

| Solvent | Miscibility at −20° C. or above | Carbon atoms— | |
|---|---|---|---|
| | | In the molecule | Calculated as maximum permissible for immiscibility |
| *Ether, nitro* | | | |
| o-Nitro anisole | I | 7 | 6 |
| o-Nitro phenotole | M | 8 | 6 |
| *Ether, carbonate* | | | |
| Beta-methoxy ethyl carbonate | I | 7 | 5 |
| *Sulfide, double bonds* | | | |
| Thiophene | M | 4 | 3 |
| *Nitro* | | | |
| Nitromethane | I | 1 | 2 |
| Nitroethane | I | 2 | 2 |
| 1-Nitro propane | M | 3 | 2 |
| Nitro benzene | M | 6 | 5 |
| *Amino (or imino)* | | | |
| Diethylene triamine | I | 4 | 5 |
| Triethylene tetramine | I | 6 | 6 |
| Dioctyl amine | M | 16 | 1 |
| Tetraoctyl ethylene diamine | M | 34 | 4 |
| Di(2-methyl butyl) amine | M | 10 | 1 |
| Piperidine | M | 5 | 1 |
| *Amino (or imino), double bonds* | | | |
| Pyrrole | M | 4 | 3 |
| Pyridine | M | 5 | 4 |
| Quinoline | M | 9 | 6 |
| Aniline | I | 6 | 5 |
| Toluidine | M | 7 | 5 |
| Xylidine | M | 8 | 5 |
| *Chloro, double bonds* | | | |
| Allyl chloride | M | 3 | 1 |
| Trichloro ethylene | M | 2 | 1 |
| *Nitrile* | | | |
| Propionitrile | I | 3 | 3 |
| *Carbonate* | | | |
| Dimethyl carbonate | M | 3 | 2 |
| Diethyl carbonate | M | 5 | 2 |
| *Phosphate* | | | |
| Trimethyl phosphate | I | 3 | 6 |
| Triethyl phosphate | I | 6 | 6 |
| Tributyl phosphate | M | 12 | 6 |
| *Sulfate* | | | |
| Dimethyl sulfate | I | 2 | More than 2 |

Similarly cotton-seed oil may be extracted with a quantity (four volume, more or less) of active solvents such as:

n-Propyl alcohol
Isopropyl alcohol
Methyl lactate
Ethyl lactate
Diacetone alcohol
Methyl cellosolve
Mono-ethyl ether of diethylene glycol
Allyl alcohol
Ethylene chlorhydrin
Furfuryl alcohol
Acetic acid
Acetic acid anhydride
Methyl formate
Glycol diformate
Glycol diacetate
Ethyl acetyl glycolate
Ethylidene diacetate
Methyl levulinate
Methyl acetoacetate
Ethyl acetoacetate
Acetaldehyde
Furfural
Diacetyl
Acetonyl acetone
Formamide
Nitromethane
Nitroethane
Triethylene tetramine
Aniline
Propionitrile
Trimethyl phosphate
Triethyl phosphate and many others to obtain immiscible systems that separate into two phases which can be separated by decantation or other methods.

Most of these solvents will also behave similarly with fish oil, linseed oil, tung oil, olive oil and animal fats such as tallow.

In a series of quantitative tests to determine the selectivity of certain liquids for unsaturated components of a glyceride oil, a soy-bean oil having an iodine number of 136 was treated with liquids in the ratio of 1 part of oil to 4 parts of extracting liquid. Extraction was effected by agitating together the oil and the extracting agent at the temperatures indicated in the following table. They were subsequently allowed to separate into two layers. One layer consisted of oil relatively poor in unsaturates in which was dissolved some of the solvent. The other layer comprised a solvent in which was dissolved oil rich in unsaturates. The layers were then separated and the extracting agent was eliminated by vacuum distillation. Iodine numbers were determined by the Wijs method. The results are tabulated below:

*Table C*

| Solvent | Temp. of separation, °C. | Per cent | | Iodine number | | Difference |
|---|---|---|---|---|---|---|
| | | Extract | Raffinate | Extract | Raffinate | |
| Nitroethane | 0 | 28.3 | 71.7 | 148.2 | 130.3 | 17.9 |
| Methyl formate | 0 | 13.8 | 86.2 | 149.6 | 133.8 | 15.8 |
| | 12 | 23.5 | 71.7 | 144.2 | 132.9 | 11.3 |
| Methyl cellosolve | 28 | 9.0 | 91 | 147.0 | 132.2 | 14.8 |
| | 70 | 43.0 | 57 | 138.0 | 131.5 | 6.5 |
| Methyl levulinate | 27 | 15 | 85 | 147.0 | 132.5 | 14.5 |
| Propionitrile | 0 | 33.2 | 66.8 | 145.5 | 131.2 | 14.3 |
| Furfural | 27 | 28 | 72 | 146.0 | 132.0 | 14.0 |
| | 40 | 38 | 62 | 144.5 | 131.0 | 13.5 |
| Trimethyl phosphate | 70 | 2 | 90 | 147.0 | 134.0 | 13.0 |
| | 128 | 11 | 89 | 144.0 | 132.8 | 11.2 |
| Acetaldehyde | 0 | 27.9 | 72.1 | 144.3 | 131.9 | 12.4 |
| Triethyl phosphate | 0 | 41 | 59 | 142.1 | 130.0 | 12.1 |
| Acetonyl acetone | 27 | 20 | 80 | 146.0 | 134.0 | 12.0 |
| | 50 | 47 | 53 | 141.0 | 131.0 | 10.0 |
| Acetone (3% water) | 27 | 41 | 59 | 139.6 | 132.8 | 6.8 |
| Diacetyl | 0 | 18 | 82 | 145.0 | 133.2 | 11.8 |
| Nitromethane | 27 | 6 | 94 | 145.0 | 133.5 | 11.5 |
| | 95 | 14.3 | 85.7 | 143.0 | 134.5 | 8.5 |
| Glycol diacetate | 65 | 38 | 62 | 141.0 | 129.7 | 11.3 |
| | 50 | 23 | 77 | 141.0 | 132.0 | 9.0 |
| Ethyl oxalate | 0 | 55.8 | 44.2 | 140.3 | 129.2 | 11.1 |
| Methyl cellosolve acetate | 0 | 41 | 59 | 140.2 | 130.2 | 10.0 |
| Methyl lactate | 70 | 23.3 | 76.7 | 139.5 | 131.7 | 9.7 |
| Ethyl lactate | 27 | 56 | 44 | 138.5 | 130.2 | 8.3 |
| Cellosolve | 0 | 56.5 | 43.5 | 138.8 | 130.7 | 8.1 |
| Ethyl maleate | 0 | 26 | 74 | 140.1 | 132.0 | 8.1 |
| Acetic anhydride | 90 | 51 | 49 | 138.2 | 131.0 | 7.2 |
| Carbitol | 125 | 22.5 | 77.5 | 139.0 | 132.8 | 6.2 |
| Propylene glycol | 27 | 5 | 95 | 139.0 | 135.0 | 4.0 |
| Acetic acid | 50 | 62 | 38 | 137.8 | 133.8 | 4.0 |
| Methyl butanolone | 0 | 49 | 51 | 137.0 | 132.2 | 3.8 |
| n-Butyramide | 120 | 30 | 70 | 136.2 | 132.5 | 3.7 |
| Isopropanol | 28 | 9 | 91 | 138.0 | 135.0 | 3.0 |
| Ethyl glycolate | 77 | 21 | 77 | 138.0 | 135.0 | 3.0 |

Linseed oil was similarly extracted with acetic acid with the following results:

*Iodine number*

| Original oil | Soluble fraction | Insoluble |
|---|---|---|
| 175 | 181 | 172 |

Marine oil (menhaden) was extracted with a series of solvents as follows:

*Iodine number*

| Solvent | Original | Soluble fraction | Insoluble |
|---|---|---|---|
| Methyl cellosolve | 187.5 | 208 | 182 |
| Ethyl acetoacetate and phenol | 186 | 201 | 161 |
| Ethyl acetoacetate | 186 | 231 | 161 |
| Phenol and petroleum ether | 184 | 189 | 181 |
| Furfural | 184 | 206 | 157 |

In the example in which ethyl acetoacetate and phenol were employed in admixture, the ratio of the two was ethyl acetoacetate 80 parts, phenol 20 parts.

Where phenol and petroleum ether were employed the ratios of the two ingredients were phenol 1 part, petroleum ether 10 parts, or 1:1 ratio using phenol plus 10% water.

Index of refraction also constitutes a measure for the drying powers of an oil. Samples of a marine oil having an index of refraction of 1.4820 were treated with ethylene chlorohydrin and pyridine to obtain two layers, one consisting of insoluble oil having a lower index of refraction than the original material and the other having a substantially higher index than the original oil. The results are as follows:

*Indices of refraction*

| Extracting agent | Original oil | Soluble | Insoluble |
|---|---|---|---|
| Ethylene chlorohydrin | 1.4820 | 1.4869 | 1.4809 |
| Pyridine | 1.4820 | 1.4850 | 1.4810 |

Those solvents indicated by the letter "M" in Table B could not be used by themselves to effect fractionation of highly unsaturated glycerides from less highly unsaturated ones, because of undue miscibility with both types. However, in many cases it is possible to mix the active solvent with an aliphatic hydrocarbon such as hexane, butane, propane, dodecane, or the like, which is relatively immiscible with the selective solvent. The hydrocarbons tend to pull the saturated glycerides away from the active solvent and permits separation of the oil into two fractions. The ratio of hydrocarbon to active solvent may vary over a broad range, e. g. 1 to 10 parts of hydrocarbon per 1 part of the active solvent. However, good results have been obtained by employment of a ratio of 4 to 1. In general the greater the proportion of hydrocarbon employed, the stronger will be the tendency to pull away the saturated glycerides from the polar solvent.

Similar methods may be employed to effect fractionation of mixtures of saturated and unsaturated fatty acids. These are usually soluble in polar or active solvents such as are listed above. However, by sufficient admixing of the solvent with a hydrocarbon it is possible to effect separation of free acids into two phases, one consisting essentially of active solvent which is rich in unsaturated acids and the other consisting essentially of hydrocarbon which is rich in saturated acids. This process is illustrated by acids from linseed oil:

```
                                          Parts by volume
Linseed oil acids_____ 200
Petroleum ether (B. P. 30–60° C.)_____ 200
Anhydrous furfural_____ 400
```

These were agitated together at room temperature and allowed to separate into layers. The solvents were then distilled off from the two fractions separately under vacuum.

```
Iodine value of original acid_____ 173
Iodine value of acid in hydrocarbon_____ 166
Iodine value of acid in furfural_____ 193
```

A 30 per cent mixture of linseed oil fatty acids in the same hydrocarbon was agitated with 1 volume of furfuryl alcohol and separated into fractions at room temperature.

```
Iodine value of original acid_____ 173
Iodine value of acid in hydrocarbon_____ 162
Iodine value of acid in solvent_____ 203
```

Ethylene glycol diacetate was agitated at room temperature with a 12 per cent by volume mixture of linseed oil fatty acids in petroleum ether, and the mixture was separated into fractions from which the solvents were eliminated.

```
Iodine value of original acids_____ 173
Iodine value of acid in hydrocarbon_____ 168
Iodine value of acid in solvent_____ 175
```

Where the herein-described selective polar solvents are employed to extract glycerine oils and free fatty acids from seed meals, extraction preferably is effected under conditions such that all components pass into solution. The dissolved material may then be suitably fractionated by manipulation of temperatures or by modification of the solubility characteristics by addition of hexane or the like. Subsequently the dissolved unsaturates may be separated from the selective solvent.

The use of phenol and petroleum ether, as shown in the above table, constitutes an example in which a relatively miscible but polar solvent is employed in combination with a non-polar hydrocarbon to obtain fractionation of the oil into less saturated and more saturated cuts.

An extension of the foregoing method would involve treatment of mixed fatty glycerides, e. g. linseed oil or soy-bean oil with a selective polar solvent such as furfural or ethyl aceto-acetate or the like, to obtain two liquid phases. The phase comprising the solvent and the more unsaturated glycerides could then be treated by batch or by counter-current or concurrent extraction with hexane or other hydrocarbon to pull out additional saturated glycerides, thus leaving a higher concentration of unsaturates in the fraction obtained from the solvent.

The immiscible fraction of oil containing a more fully saturated glyceride after separation from the solvent may be treated in an additional stage with a more sharply selective solvent to remove therefrom additional unsaturated material.

An example of such procedure would involve initial extraction of soy-bean or similar oil with furfural followed by treatment of the immiscible phase with nitroethane to remove therefrom an additional quantity of unsaturated material.

Similarly polar solvents such as methyl cellosolve acetate which are miscible at all practicable temperatures with glycerides such as occur in tung oil and oiticica oil may be employed in combination with hexane or other open chain hydrocarbons to obtain separation into a hydrocarbon soluble fraction and a fraction soluble in the polar or active solvent. In this process the proportion of hydrocarbon to the polar solvent may vary over a broad range. However, the higher the ratio of hydrocarbon, the more selective will be the system.

In some cases where extreme selectivity of the system is not required, a readily miscible solvent such as phenol may be incorporated with a more selective solvent to increase yield of extract. Such system is illustrated by ethyl acetoacetate-phenol above described. These ingredients may be employed in a ratio of 1 part of phenol to 4 parts of ethyl acetoacetate.

Separation of the glyceride or acid fractions and the solvents may be effected, as previously stated, by crystallization, vacuum distillation, steam distillation or other methods. A convenient method involves addition of water, which tends to reduce the solubility of the glycerides in the solvent. The water may be employed in an amount sufficient to saturate the solvent or if the solubility of water in the solvent is high it may be added until the glycerides or the free fatty acids separate.

Appropriate variations in the mode of manipulating the fractions obtained by solvent extraction of a glyceride oil would involve further fractionating or splitting one of the fractions, e. g. the solution of highly unsaturated glycerides, to obtain a portion which is richer in unsaturates than the initial fraction and a fraction which is poorer in unsaturates. The latter fraction can then be recycled by admixing it with fresh glycerides or with glycerides at an appropriate stage of extraction. For example, a fraction comprising furfural saturated with glycerides of high drying power may be steam distilled to drive off some of the solvent, or may be chilled, thus causing some of the less soluble (more saturated) glycerides to be separated. This latter fraction can then be recycled.

Manifestly, the highly miscible solvents which can not be conveniently employed by themselves in the fractionation of mixed glycerides can still be employed to extract the glycerides from seed meals and pulp. Afterwards the more selective solvents can be applied to the whole oil after or before elimination of the initial solvent to separate a highly unsaturated fraction. Ethyl acetoacetate is of particular value in the extraction of fish oils.

It possesses low solvent powers for the break and color constituents of various oils and accordingly by application of it, it is possible directly to dissolve out most of the constituents of the oil, useful in paints and varnishes, to obtain a product which is low in break and color and which dries rapidly to non-tacky films. When warm, it may also be used directly to extract vegetable oils such as linseed oil, or soybean oil from the meal or pulp. The following constitutes a specific example of its application to the treatment of raw fish oil, such as sardine or menhaden oils.

Oil in the ratio of one part was contacted in three stages with three parts of ethyl acetoacetate at room temperature to obtain a fraction in solution constituting 60 per cent of the total volume of oil. This fraction upon separation from the solvent by evaporation of the solvent, or by adding water was found to be of a pale green color and to dry practically free of tack. The fish-like odor was substantially less pronounced than in ordinary oil. The residue was of a deep reddish brown color of substantially lower index of refraction and iodine number than the original oil. It dried very slowly and remained permanently tacky. The yield of oil can be increased though with slight impairment of quality by the addition of phenol in considerable portions (15 to 30 per cent more or less). The use of methyl alcohol or ethyl alcohol in 2:1 ratio on the ethyl acetoacetate extract of the raw fish oil produced a raffinate whose acid number was 0.0 and whose iodine number had increased to the remarkable value of 212.5. This oil was pale green; it had a very bright appearance. The drying test showed the film to be slightly better than raw linseed oil in regard to tack. The test values are as follows:

| Oil | Iodine value (Wijs) | Acid value |
| --- | --- | --- |
| Raw oil | 186 | 15.3 |
| 1st extract | 201 | 7.7 |
| Alcohol treated | 212.5 | 0.0 |

Combination of ethyl acetoacetate and furfural extraction may sometimes be desirable. For example, raw fish oil (such as menhaden) was extracted with ethyl acetoacetate at 39° C. and a fraction containing 80% of the oil was recovered. The product was then extracted with furfural saturated with water in 1:1 ratio, at 20° C. The loss from the product as a result of extraction was only 2 or 3% and the color was materially improved. The results of tests conducted upon the material are tabulated as follows:

| Oil | Acid value |
| --- | --- |
| Raw marine | 15.3 |
| 80% extract | 5.6 |
| Furfural–H$_2$O extracted oil | 0.9 |

Marine oils, which normally produce tacky films when treated with solvents, in accordance with the provisions of the present invention, do not show any break even when heated to upward of 600° F. They dry faster than linseed oil. The films produced by them are non-tacky, free of fishy odor and are highly resistant to blistering.

Upon extracting linseed oil with 2 to 3 parts by weight of ethyl acetoacetate, 80% of the oil was dissolved and upon recovery from the solvent it was found to be free from break and of a pale yellow color which changed to green when the oil was heated to 600° F.

Other drying oils such as hempseed oil, soybean oil, perilla oil, etc. may be treated with furfural, ethyl acetoacetate, or the like, in order to obtain refined fractions, if so desired.

Detailed discussion of the treatment of glyceride oils with furfural are contained in copending application Serial No. 144,315, to Stephen E. Freeman, filed May 22, 1937, of which the present case is a continuation in part.

The foregoing examples are to be considered merely as illustrative and numerous modifications may be made therein without departure from the spirit of the invention or the scope of the following claims.

I claim:

1. A process of selectively separating a fraction which is rich in unsaturated glycerides from a material containing said glycerides in admixture with a more completely saturated glyceride, which process comprises contacting the material with an organic solvent, said solvent containing at least one of the activating groups listed in Table A, the total number of carbon atoms in the molecule of solvent not exceeding the sum permissible for the activating groups as determined by the table, which at a low temperature is relatively immiscible with the saturated glyceride, the temperature of treatment being above about minus 20° C., the ratio of solvent and the temperature being below that of complete miscibility with the glycerides, separating the two phases while they are both in liquid state, one containing primarily undissolved glycerides relatively poor in unsaturated glycerides and containing some solvent and the other consisting of solvent in which is dissolved glycerides relatively rich in unsaturates.

2. A process as defined in claim 1 in which the selective solvent is a keto ester.

3. A process as defined in claim 1 in which the solvent is an aldehyde.

4. A process as defined in claim 1 in which the solvent is a hydroxy compound.

5. A process as defined in claim 1 in which the selective solvent is a cyclic aldehyde having a plurality of activating groups.

6. A process as defined in claim 1 in which the glycerides are those obtained from soy-bean oil.

7. A process as defined in claim 1 in which the glycerides are those of linseed oil.

8. A process as defined in claim 1 in which the material treated is an oil extracted from a seed meal.

9. A process as defined in claim 1 in which the material treated is a vegetable meal containing the oil.

10. A process as defined in claim 1 in which the fraction rich in unsaturated material is further treated with water in order to effect separation of the dissolved glycerides therein.

11. A process as defined in claim 1 in which the treatment of the material is further effected in the presence of an aliphatic hydrocarbon.

12. A process of extracting fatty glycerides from seed meals which comprises treating meals with a polar organic solvent containing at least one group selected from those enumerated in Table A, the number of carbon atoms in the molecule not substantially exceeding the number permissible for the activating groups as disclosed in Table A, the temperature of treatment being above that of immiscibility of the glycerides and the solvent, then cooling the resultant solution to effect separation into liquid phases, one consisting substantially of glycerides poor in unsaturates and the other consisting of glycerides rich in unsaturates dissolved in the solvent.

13. A process as defined in claim 1 in which the solvent is from the group consisting of organic acids, esters of organic acids and organic acid anhydrides and is contained in the following class:

| | |
|---|---|
| Ethyl glycolate | Methyl malonate |
| Ethyl acetyl glycolate | Beta ethoxy ethyl lactate |
| Methyl acetoacetate | |
| Ethyl acetoacetate | Beta ethoxy ethyl acetate |
| Methyl lactate | |
| Ethyl lactate | Beta hydroxy ethyl acetate |
| Methyl formate | |
| Methyl chloroacetate | Methyl levulinate |
| Glycol diformate | Ethyl levulinate |
| Glycol diacetate | Trimethyl phosphate |
| Ethylidene diacetate | Triethyl phosphate |
| Ethyl oxalate | Acetic acid |
| Ethyl maleate | Acetic anhydride |

14. A process of selectively separating a fraction which is rich in unsaturated glycerides from a material containing said glycerides in admixture with a more completely saturated glyceride, which process comprises contacting the material with ethyl aceto acetate, the temperature of treatment being above about minus 20° C., the ratio of solvent and the temperature being below that of complete miscibility with the glycerides, separating the two phases while they are both in liquid state, one containing primarily undissolved glycerides relatively poor in unsaturated glycerides and containing some solvent and the other comprising solvent in which is dissolved glycerides relatively rich in unsaturates.

STEPHEN E. FREEMAN.